(12) United States Patent
Dariush et al.

(10) Patent No.: US 9,050,980 B2
(45) Date of Patent: Jun. 9, 2015

(54) REAL TIME RISK ASSESSMENT FOR ADVANCED DRIVER ASSIST SYSTEM

(71) Applicants: Behzad Dariush, Menlo Park, CA (US); David A. Thompson, Bellafontaine, OH (US)

(72) Inventors: Behzad Dariush, Menlo Park, CA (US); David A. Thompson, Bellafontaine, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/775,515

(22) Filed: Feb. 25, 2013

(65) Prior Publication Data
US 2014/0244105 A1     Aug. 28, 2014

(51) Int. Cl.
| | |
|---|---|
| G06F 17/00 | (2006.01) |
| B60W 40/04 | (2006.01) |
| B60W 50/00 | (2006.01) |
| B60W 30/095 | (2012.01) |
| G01S 13/93 | (2006.01) |

(52) U.S. Cl.
CPC .............. *B60W 40/04* (2013.01); *G01S 13/931* (2013.01); *B60W 50/0098* (2013.01); *B60W 30/0956* (2013.01); *B60W 2050/0075* (2013.01); *B60W 2550/10* (2013.01); *B60W 2550/12* (2013.01)

(58) Field of Classification Search
CPC ................ B60W 40/09; B60W 50/10; G01S 2013/9332; G01S 17/936; G06F 17/00; G08G 1/166
See application file for complete search history.

(56) References Cited

U.S. PATENT DOCUMENTS

| | | | |
|---|---|---|---|
| 5,296,852 A * | 3/1994 | Rathi | 340/933 |
| 6,580,973 B2 | 6/2003 | Leivian et al. | |
| 6,675,081 B2 | 1/2004 | Shuman et al. | |
| 6,982,635 B2 | 1/2006 | Obradovich | |
| 7,518,545 B2 | 4/2009 | Minichshofer | |
| 7,966,127 B2 | 6/2011 | Ono et al. | |
| 8,108,147 B1 * | 1/2012 | Blackburn | 701/301 |
| 8,542,106 B2 * | 9/2013 | Hilsebecher et al. | 340/435 |
| 2004/0217851 A1 * | 11/2004 | Reinhart | 340/435 |
| 2005/0021224 A1 | 1/2005 | Gray | |
| 2005/0060069 A1 * | 3/2005 | Breed et al. | 701/29 |
| 2005/0195383 A1 * | 9/2005 | Breed et al. | 356/4.01 |
| 2006/0195231 A1 * | 8/2006 | Diebold et al. | 701/1 |
| 2007/0043491 A1 | 2/2007 | Goerick et al. | |
| 2007/0276577 A1 | 11/2007 | Kuge et al. | |
| 2008/0084283 A1 | 4/2008 | Kalik | |

(Continued)

OTHER PUBLICATIONS

Inoue, H. "Next step of driver assistance—Toyota's point of view," Jun. 8, 2010, Toyota Motor Corporation, pp. 29-37.

(Continued)

*Primary Examiner* — John R Olszewski
*Assistant Examiner* — Nicholas K Wiltey
(74) *Attorney, Agent, or Firm* — Fenwick & West LLP (57) ABSTRACT

A driver assistance system is described that takes as input a number of different types of vehicle environment inputs to provide driver assistance to a driver. To provide the assistance, the driver assistance system synthesizes the inputs. For objects in the vehicle environment detected in the inputs, object risk values are determined by applying a set of rules to the objects. The object risk values are aggregated by quadrant to generate a set of quadrant risk values. A driver assistance system of the vehicle is controlled based on the quadrant risks.

19 Claims, 9 Drawing Sheets

(56) References Cited

U.S. PATENT DOCUMENTS

| | | |
|---|---|---|
| 2008/0188996 A1 | 8/2008 | Lucas et al. |
| 2009/0051516 A1 | 2/2009 | Abel et al. |
| 2009/0076702 A1* | 3/2009 | Arbitmann et al. ............. 701/96 |
| 2009/0326818 A1* | 12/2009 | Koehler et al. ............... 701/300 |
| 2010/0085238 A1 | 4/2010 | Muller-Frahm et al. |
| 2010/0106418 A1 | 4/2010 | Kindo et al. |
| 2010/0131155 A1* | 5/2010 | Becker et al. ................... 701/45 |
| 2010/0208075 A1* | 8/2010 | Katsuno ........................ 348/148 |
| 2010/0228419 A1 | 9/2010 | Lee et al. |
| 2010/0253526 A1* | 10/2010 | Szczerba et al. ............. 340/576 |
| 2011/0032119 A1 | 2/2011 | Pfeiffer et al. |
| 2012/0035846 A1* | 2/2012 | Sakamoto et al. ............ 701/301 |
| 2012/0083942 A1* | 4/2012 | Gunaratne ........................ 701/1 |
| 2012/0307059 A1* | 12/2012 | Yamakage et al. ............ 348/148 |
| 2012/0323479 A1* | 12/2012 | Nagata .......................... 701/301 |

OTHER PUBLICATIONS

Lattner, A. et al. "Knowledge-based Risk Assessment for Intelligent Vehicles," *International Conference Integration of Knowledge Intensive Multi-Agent Systems, KIMAS05, Modeling, Evolution and Engineering*, 2005, pp. 191-196, IEEE Press, Boston, USA.

Röckl, M. et al., "An Architecture for Situation-Aware Driver Assistance Systems," *IEEE*, 2007, pp. 2555-2559.

Wolf, M. T. et al., "Artificial Potential Functions for Highway Driving with Collision Avoidance," *2008 IEEE International Conference on Robotics and Automation*, May 19-23, 2008, pp. 3731-3736, Pasadena, CA, USA.

PCT International Search Report and Written Opinion, PCT Application No. PCT/US2014/16945, Mar. 19, 2014, ten pages.

PCT International Search Report and Written Opinion, PCT Application No. PCT/US2014/21924, Jul. 30, 2014, nine pages.

\* cited by examiner

REAL TIME RISK ASSESSMENT FOR ADVANCED DRIVER ASSIST SYSTEM

FIELD OF ART

The invention relates to driver assistance systems and more particularly to automotive driver assistance systems and methods.

BACKGROUND

Driver assistance systems are control systems for vehicles that aim to increase the comfort and safety of vehicle occupants. Driver assistance systems can, for example, provide lane departure warnings, assist in lane keeping, provide collision warnings, automatically adjust cruise control, and automate the vehicle in low speed situations (e.g., traffic).

Due to the general tendency to provide occupants with new safety and comfort functions, the complexity of modern vehicles has increased over time, and is expected to increase further in the future. The addition of new driver assistance features adds complexity to the operation of the vehicle. Since these driver assistance systems use light, sound, and active vehicle control, they are necessarily intrusive into the driver's control of the vehicle. Consequently, new driver assistance systems take time for drivers to learn. Drivers sometimes ignore or disable these systems rather than learn to use them.

SUMMARY

A driver assistance system is described that takes as input a number of different types of vehicle environment inputs to provide a number of different kinds of driver assistance to a driver. To provide the assistance, the driver assistance system synthesizes the inputs in such a way so as to improve the usability of the assistance provided to the driver. Consequently, the driver assistance system is easier for new drivers to learn to use, and thus less likely to be ignored or disabled.

In one embodiment, a driver assistance system is configured to receive a plurality of vehicle environment inputs, the inputs comprising a position in two dimensions for each of a plurality of objects located around a vehicle, each object located in one of four quadrants surrounding the vehicle; determine an object risk value for each of the objects by applying a set of rules to each of the objects; aggregate the object risk values by quadrant to generate a set of quadrant risk values comprising a front risk value, a back risk value, a left risk value, and a right risk value; and control the driver assistance system of the vehicle based on the quadrant risks. Such a system may include an electronic control unity (ECU) including a processor for performing the above steps. The system may also include a knowledge base for storing the set of rules, where the knowledge base comprises a non-transitory computer-readable storage medium. Methods for performing the above steps are also described.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION OF THE INVENTION

Driver Assistance System Overview

Figure 1:
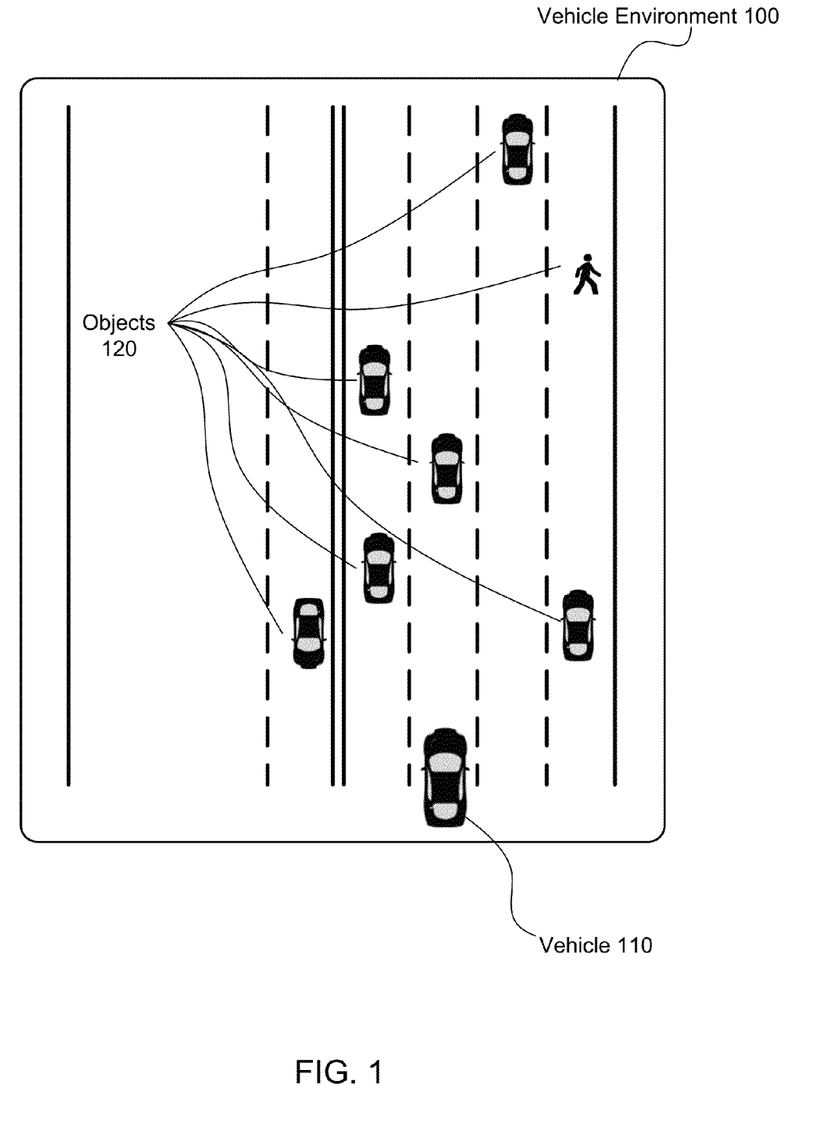
FIG. 1 illustrates a vehicle environment, according to one embodiment.

FIG. 1 illustrates a vehicle environment 100, according to one embodiment. The environment 100 surrounding a vehicle 110 includes objects 120 that are to be avoided. The driver assistance system is configured to assist the driver of the vehicle 110 in navigating the vehicle environment 100 to avoid the objects. The exact physical extent of the vehicle environment 100 around the vehicle may vary depending upon the implementation.

Objects 120 sought to avoided include anything that can be present in the driver's path, for example, other vehicles, including cars, bicycles, motorcycles, trucks, etc., pedestrians, animals trees, bushes, plantings, landscaping, road signs, and stoplights. This list is intended to be exemplary, and is not considered to be comprehensive. Generally, the driver assistance system is capable of assisting the driver of a vehicle 110 in avoiding any physical object.

Figure 2:
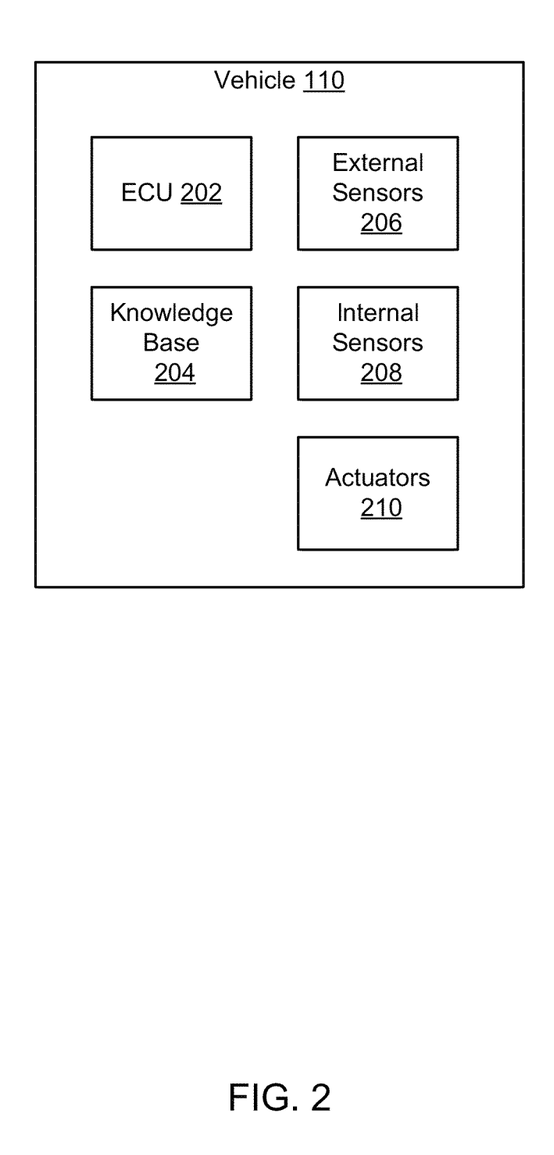
FIG. 2 is a block diagram illustrating components of a vehicle with respect to a driver assistance system, according to one embodiment.

FIG. 2 is a block diagram illustrating components of the vehicle 110 with respect to a driver assistance system, according to one embodiment. The vehicle includes one more electronic control units (ECUs) 202, a knowledge base 204 including a set of rules for use with the driver assistance system, external 206 and internal 208 sensors for collecting vehicle environment inputs for the driver assistance system, and actuators 210 for controlling the vehicle based on the output of the driver assistance system.

The sensors 206 and 208 collect input data regarding the environment surrounding the vehicle 110. External sensors 206 include, for example, radio detecting and ranging (RADAR) sensors for detecting the positions of nearby objects 120. Light detecting and ranging (LIDAR) may also be used in external sensors 206 in addition to or in place of RADAR. Both RADAR and LIDAR are capable of determining the position (in two dimensions, e.g., the X and Y directions) as well as the distance between a sensed object 120 and the vehicle 110. Although RADAR and LIDAR are provided as examples, other types of sensors may also be used to detect the positions of nearby objects.

RADAR, either alone or in combination with ECU 202 and knowledge base 204, can also provide semantic input information related to an object 120. For example, RADAR may identify an object position as well as a location of lane boundary markers. These inputs may be processed to provide as an input the lane in which a particular object 120 is located. RADAR may also provide information regarding the shape (e.g., physical extent, distance between different parts of the same mass) of an object 120. Consequently, the shape information may be correlated with information stored in the knowledge base 204 to identify the type of object 120 is being sensed (e.g., pedestrian, vehicle, tree, bicycle, large truck, small truck etc.).

External sensors 206 may also include external cameras in the operating in the visible or IR spectrums. External cameras may be used to determine the same or additional information provided by RADAR, alone or in conjunction with the ECU 202 and knowledge base 204.

External sensors 206 may also include a global positioning system (GPS) capable of determining and/or receiving the vehicle's location on the earth (i.e., its geographical position). External sensors 206 may include devices other than a GPS capable of determining this information, for example the vehicle 110 may be connected to a data or voice network capable of reporting the vehicle's geographical position to an appropriately configured sensor 206. For example, a portable phone attached to a wireless network may provide geographical position information.

Based on the vehicle's 110 geographical position, one or more communications devices may be used to obtain information relevant to (i.e., local or proximate to the vehicle's location) including traffic information, road maps, local weather information, vehicle to vehicle communications, or other information that is related to otherwise impacts driving conditions. For example, ECU 202 may include or be coupled to a wireless communication device that is wirelessly communicatively coupled to an external voice or data network may be used to download this information from a remote computing network located externally to the vehicle 110.

Internal sensors 208 include velocity, acceleration, yaw, tilt, mass, force, and other physical quantity sensors that detect the properties and movement of the vehicle 110 itself. In combination, internal sensors 208 and external sensors 206 allow the ECU 202 to distinguish between changes to the vehicle vs. changes in the vehicle environment due to external factors. For example, the velocity and/or acceleration of an object 120 moving towards the vehicle 110 can be distinguished and separated from the velocity and/or acceleration of the vehicle 110 towards the object 120.

Internal sensors 208 also include driver awareness sensors that detect whether the driver is paying attention and/or what the driver is paying attention to. These internal sensors 208 may include, for example, an eye gaze sensor for detecting a direction of eye gaze and a drowsiness system for determining whether a driver is drowsy or sleeping (e.g., using a camera). Internal sensors 208 may also include weight or seatbelt sensors to detect the presence of the driver and passengers.

The external 206 and internal sensors 208 provide received information as data inputs to the ECU 202 for use with the driver assistance system. The ECU is configured to process the received inputs in real time according the driver assistance system to generate four quadrant risks in real time indicating the current risk levels in four quadrants (left, right, front, and back) surrounding the vehicle 110.

The ECU 202 is configured to draw upon a knowledge base 204 including a set of rules for determining risk to the vehicle 110 posed by the objects 120 in the vehicle's environment detected by the sensors. The rules may be precompiled based on the behavior that an expert driver of the vehicle 110 would undertake to reduce harm to the vehicle 110 and its occupants. In one embodiment, the knowledge base 204 may be determined in advance and loaded into the vehicle 110 for later use. In one embodiment, the knowledge base 204 may be tuned in advance or revised in the field based on the vehicle's configuration 110 (e.g., racecar vs. truck vs. minivan) or the driver's driving history. Thus, the knowledge base 204 may not be fixed and may be tuned to the patterns and experience of the driver.

The ECU 202 is configured to use the generated quadrant risks to control, again in real time, the operation of one or more vehicle actuators 210. The vehicle actuators 210 control various aspects of the vehicle 110. Vehicle actuators 210 include, for example, the vehicle's throttle, brake, gearshift, steering, airbags, seatbelt pre-tensioners, side impact warning system, situation aware lane departure warning system, lane keeping warning system, entertainment system (both visual and audio), and a visual and/or audio display of the quadrant risk level. Responsive to one or more inputs received by the ECU 202 and based on the quadrant risks generated by the ECU 202, one or more of the vehicle's actuators 210 may be activated to mitigate risk to the vehicle 110 and its occupants.

For the situation aware lane departure warning system, the quadrant risk may be used to dynamically adjust the amplitude of the warning provided by the warning system. For example, if the vehicle drifts to the lane to its right and the right quadrant risk is comparatively low, then the warning level provided by the warning system may also be comparatively low. In contrast, if the vehicle drifts to the lane to its right and the quadrant risk is comparatively high, then the warning level provided by the warning system may also be comparatively high.

For the display of the quadrant risks, either an existing display may be used to display the quadrant risk (e.g., some portion of the vehicle dashboard or a screen of the audio/video system and/or on-board navigation system), or a separate display may be added to the vehicle for this purpose. The quadrant risks may be displayed in numerical format and/or in a color coded or visually distinguishing format.

In one implementation, the sensors 206 and 208, ECU, knowledge base 204 and actuators are configured to communicate using a bus system, for example using the controller area network (CAN). In one implementation, the ECU 202 includes a plurality of ECUs rather than being unified into a single ECU. The CAN bus allows for exchange of data between the connected ECUs. In one implementation, the knowledge base 204 is stored in non-transitory computer readable storage medium. The ECU 202 comprises a processor configured to operate on received inputs and on data accessed from the knowledge base 204.

Figure 3A:
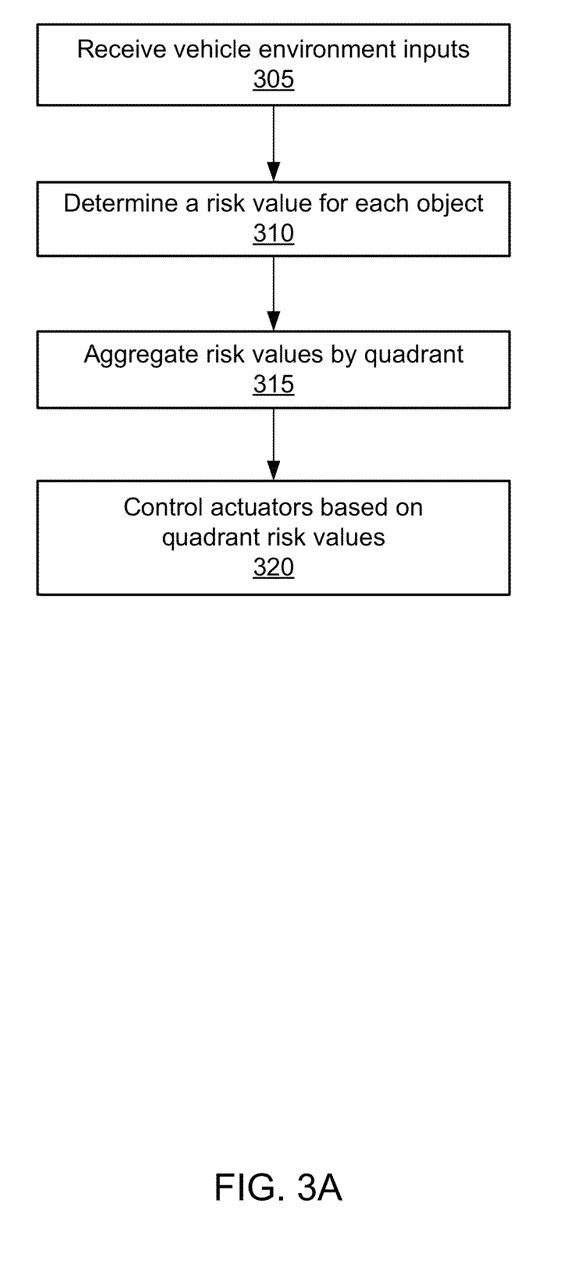
FIG. 3A is a block diagram illustrating a process for assisting a driver, according to one embodiment.

FIG. 3A is a block diagram illustrating a process for assisting a driver, according to one embodiment. The driver assistance system receives 305, in real time, a plurality of vehicle environment inputs through sensors 206 and 208. The driver assistance system processes, in real time, the inputs using the set of rules from knowledge base 204 to determine 310 a risk value for each object 120 in the environment 100. The driver assistance system aggregates 315 the risk values into quadrant risk values. The driver assistance system uses the quadrant risk values to control 320 the actuators 210 on the vehicle.

Figure 8:
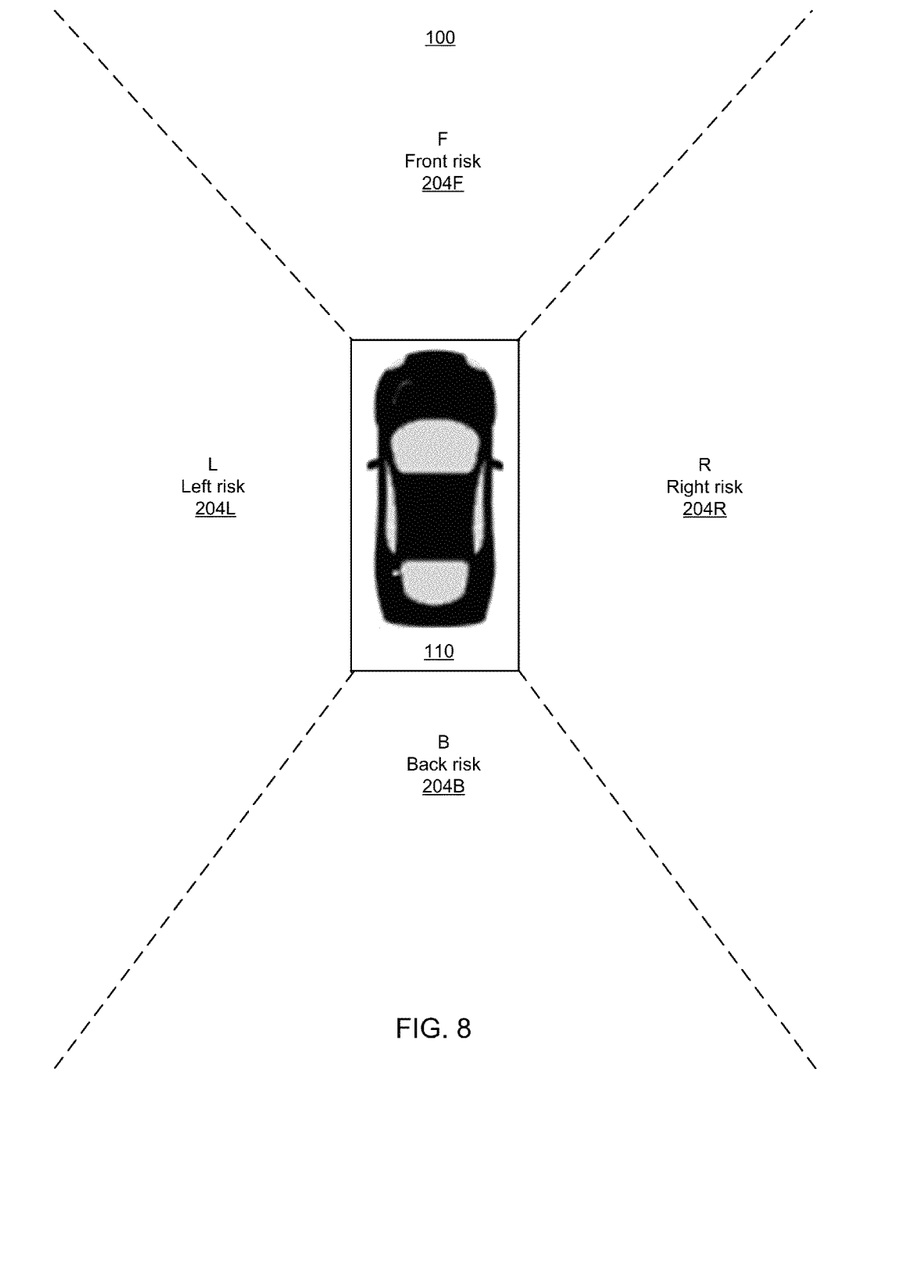
FIG. 8 illustrates a vehicle environment and the quadrants into which object risks are aggregated by the driver assistance system based on their location with respect to the vehicle, according to one embodiment.

FIG. 8 illustrates a vehicle environment 100 and the quadrants into which the object risks are aggregated by the driver assistance system based on their location with respect to the vehicle 110, according to one embodiment. The quadrant risk values include a front risk 204F, a right risk 204R, a back/behind risk 204B, and a left risk 204L. FIG. 8 further illustrates the quadrants the quadrant risks correspond to.

The front risk 20F is in a front quadrant including the area roughly in front of the vehicle as well as some of the area off to the left or right in front of the vehicle. The right risk 204R is in a right quadrant including the area to the right of the vehicle as well as some of the area in front of or behind the right of the vehicle. The back/behind risk 204B is in a back/behind quadrant including behind the vehicle, as well as some of the area off to the left or right behind the vehicle. The left risk 204L is in a left quadrant including the area of the left of the vehicle as well as some of the area in front of or behind the left of the vehicle.

Determination of Object Risk Values

As described above with respect to FIG. 3, the driver assistance system processes the received inputs to determine 310 the risk posed by each object 120 in the vehicle's environment 110. In one implementation, the risk values are determined 310 using a set of rules from knowledge base 204 to determine risk values. The rules are not a strict set of if-then rules, though they may be loosely phrased that way. Rather, the rules comprise membership functions in which inputs may be at least partial members of more than one input membership function at a time. The rules correlate degree of membership in particular input membership functions with particular risk membership functions to determine 310 the risk value of each object 120.

Figure 3B:
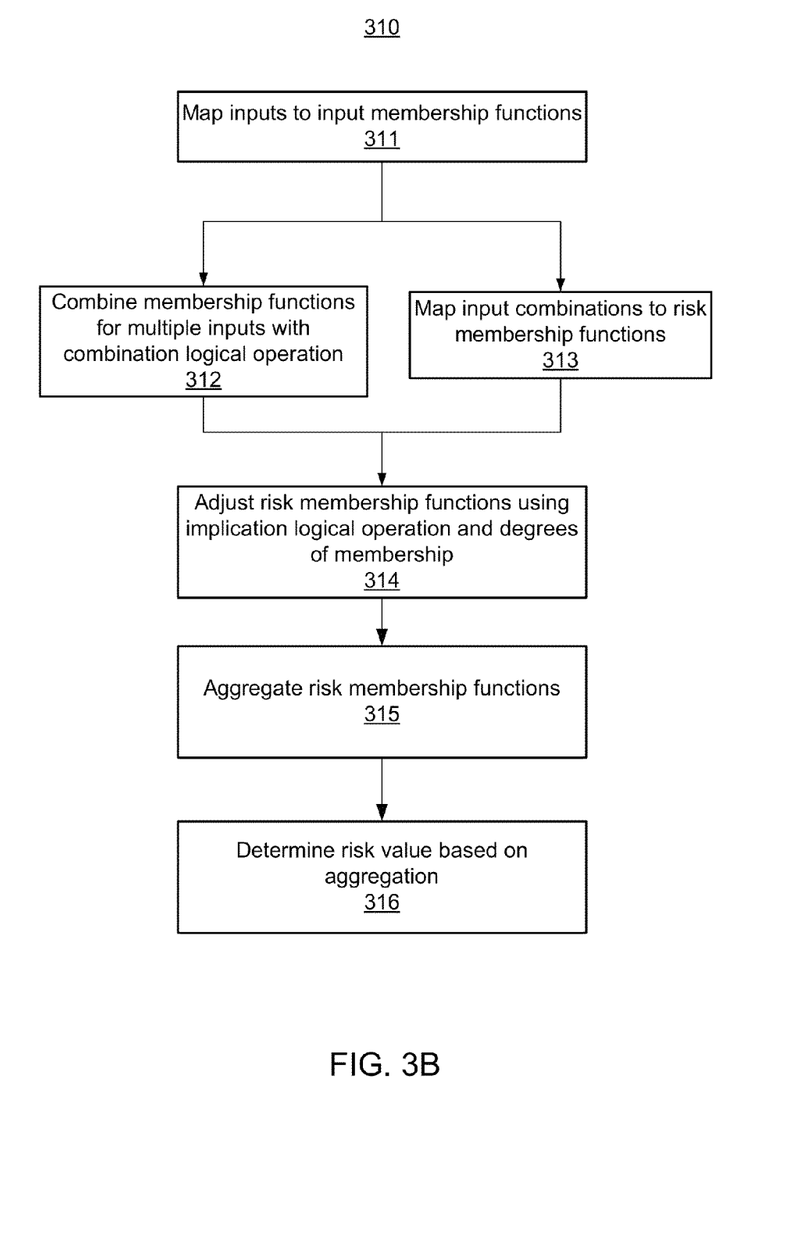
FIG. 3B is a block diagram illustrating a process for determining risk values, according to one embodiment.

FIG. 3B describes a process for determining 310 risk value using the set of rules from the knowledge base 204, according to one embodiment. Each rule includes a set of inputs, a set of input membership functions, a set of risk membership functions, and mappings between permutations of input membership functions and risk membership functions. These concepts will be described further below.

Figure 4:
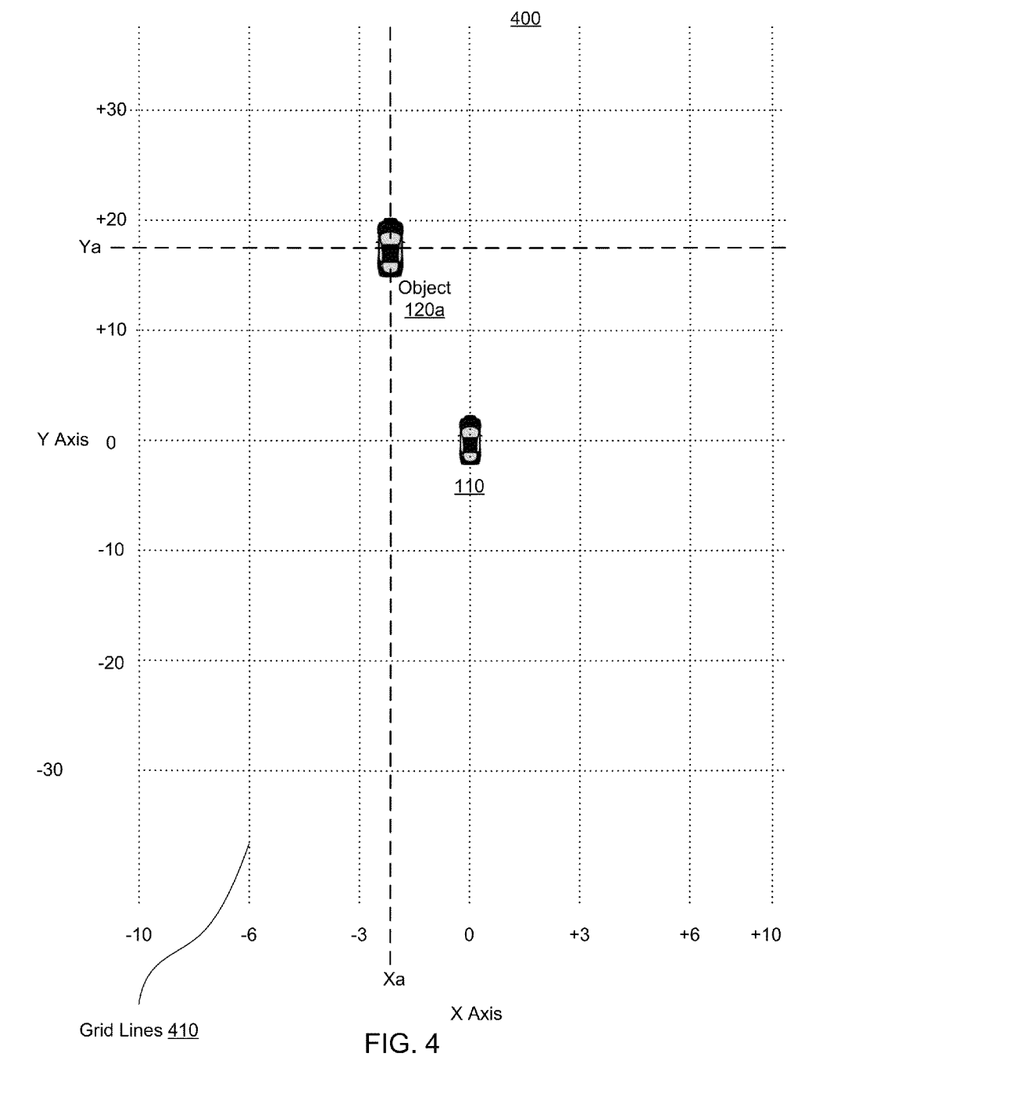
FIG. 4 is a grid illustration of a vehicle environment, according to one embodiment.
Figure 5:
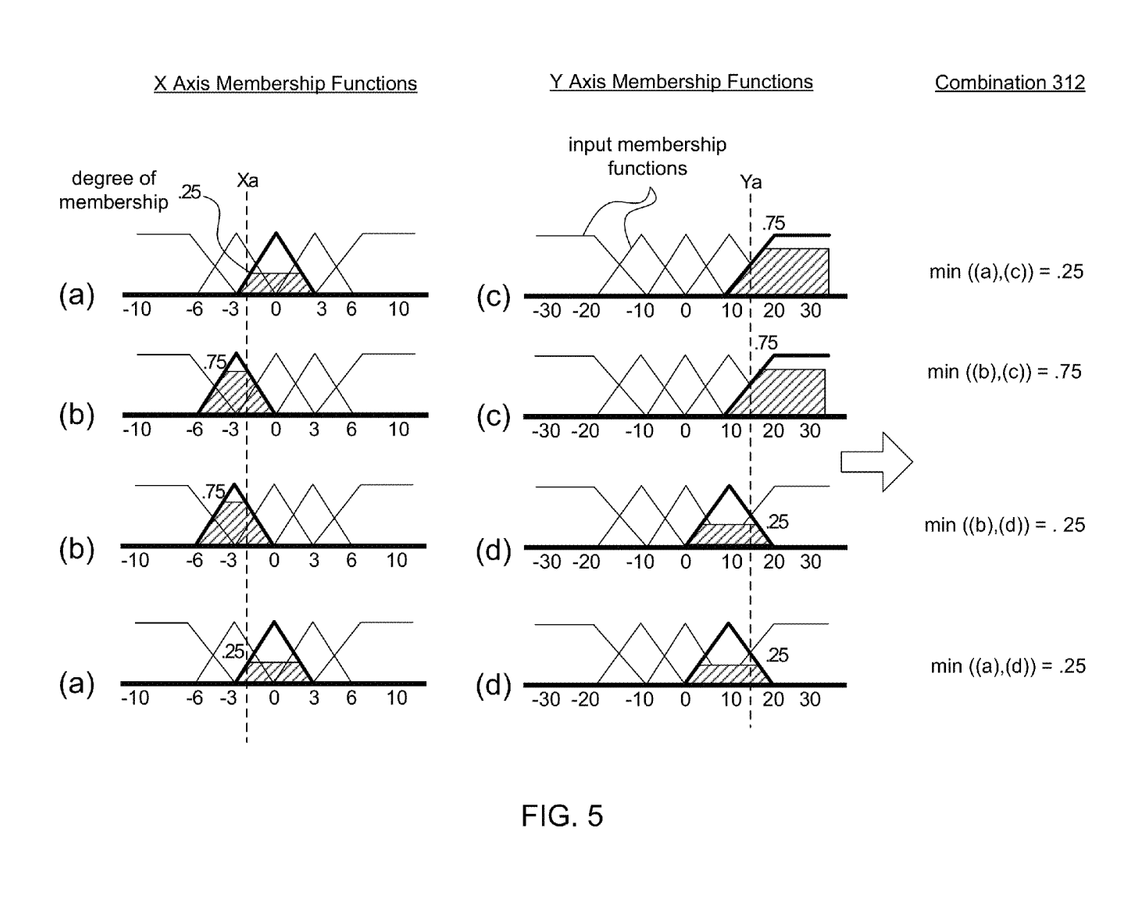
FIG. 5 illustrates input membership functions for evaluating the risk of an object in the vehicle environment, according to one embodiment.
Figure 6:
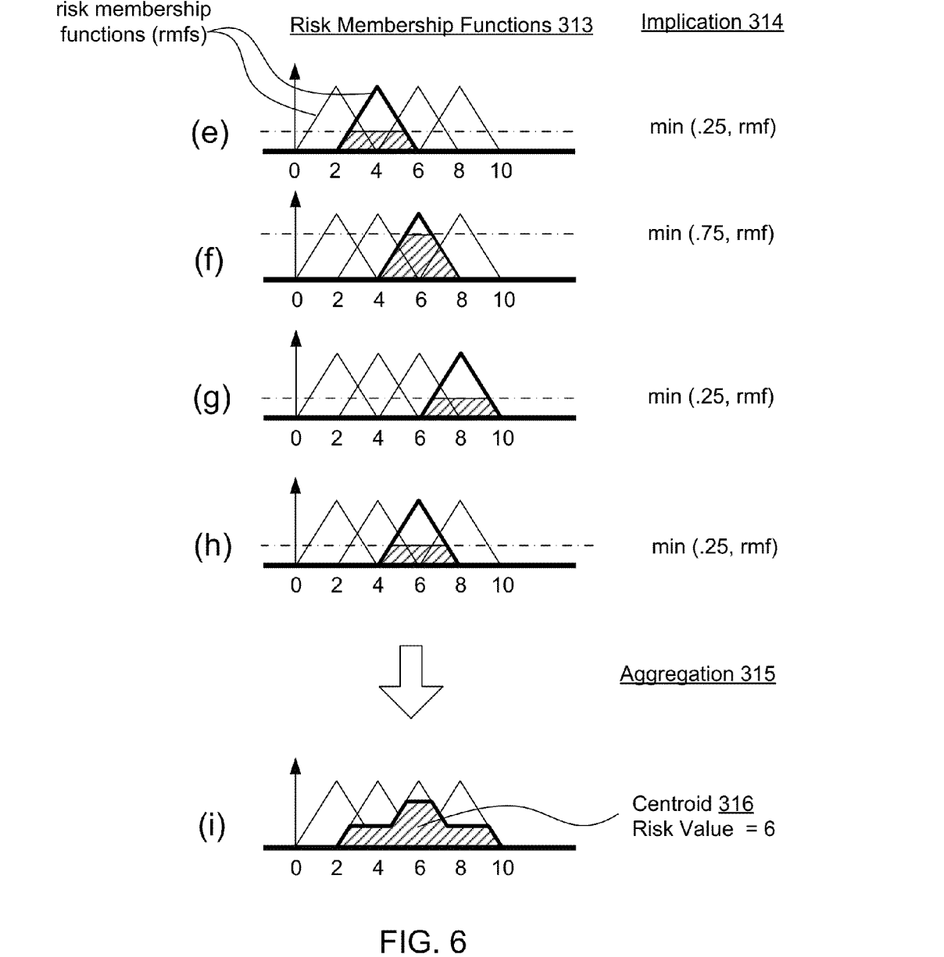
FIG. 6 illustrates risk membership functions for evaluating the risk of an object in the vehicle environment, according to one embodiment.

Initially, the vehicle inputs received from the sensors 206 and 208 are mapped 311 to input membership functions. FIGS. 4-6 illustrates an example mapping 311 of position inputs of an example object 120a relative to the vehicle 110 to input membership functions from knowledge base 204, for the purpose of determining a risk value posed by the object 120a. In the example implementation of FIGS. 4-6, it is assumed that only the X and Y axis position contributes to an object's risk value. In practice, many other inputs will contribute to the risk value, including at least some or all of the inputs described above. Further, in the example of FIGS. 4-6 the risk posed by object 120a is only determined with respect to one quadrant, however it is possible for a single object 120a to generate a non-zero risk value in more than one quadrant at a time.

FIG. 4 is a grid illustration 400 of a vehicle environment 100, according to one embodiment. The grid 400 is illustrative of one way in which the vehicle environment 100 can be divided up into a series of membership functions. In the example embodiment of FIG. 4, the grid lines 410 correspond to distances in either the X or Y direction away from the vehicle 110. Note that in FIG. 4, the X and Y axes are not on the same scale. Object 120a is located at position Xa, Ya, on the X and Y axes, respectively.

FIG. 5 illustrates example input membership functions for the position input of an object 120 relative to the vehicle 110. In this example, the X and Y position inputs are considered to be separate inputs, although they need not be in different embodiments. Generally, any input can be a member of more than one input membership function. As described herein, membership of an input to a membership function includes partial membership. In the example illustrated in FIG. 4, the example object 120a has position inputs of Xa equal to −2.5 and Ya equal to 18. Items (a) through (d) in FIG. 5 illustrate the different possible memberships of the example Xa and Ya position inputs. For example, the Xa position input is a member of two input measurement functions, illustrated in items (a) and (b) and highlighted in bold.

Particularly, item (a) illustrates the membership of the Xa position input in the input membership function between −3 and 3 on the X axis. Item (b) illustrates the membership of the Xa position input in the membership function between 0 and −6 on the X axis. Item (c) illustrates the membership of the Ya position input in the membership function covering positions greater than 10 on the Y axis. Item (d) illustrates the membership of the Ya position input in the membership function between 0 and 20 on the Y axis.

In the example of FIG. 5, each input membership function is illustrated as a triangle. In general, any shape of function may be used for a membership function including, for example, a piece-wise linear function, a Gaussian distribution function, a sigmoid function, a quadratic and/or cubic polynomial function, and a bell function.

Although illustrated as mostly identical, the input membership functions do not need to be identical across different values of the input. Using the X position input as an example, the membership functions may be different functions entirely further out along the X axis from the vehicle 110, and/or may be shaped differently further out along the X axis. The outermost position input membership functions in FIG. 5 illustrate this.

The extent to which an input is considered to be a member of an input membership function is referred to as a degree of membership. The ECU 202 processes each input to determine a degree of membership for each input membership function of which it is a partial member. The degree of membership an input has to an input membership function is the point on a curve of an input membership function that matches the input. Often, the degree of membership is a value between a limited range, such as between 0 and 1, inclusive, though this is not necessarily the case. The degree of membership is divorced by at least one step from the numerical value of the input. For example, as above, the Xa position input of object 120a is −2.5. However as illustrated in items (a) and (b), the degree of membership is 0.25 for the membership function between −3 and 3 (item (a)), and is 0.75 for the membership function between −6 and 0 (item (b)).

As part of the process of determining the risk value of an object, the various inputs of a single rule are combined 312. To do this, the membership functions of which the inputs are members are combined 312 based on their respective degrees of membership using one or more combination logical operators. The logical operation/s chosen for the combination 312 affects how the inputs, input membership functions, and degrees of membership contribute to the risk value.

The logical operators are chosen from a superset of the Boolean logic operators, referred to as the fuzzy logic operators. These include, for example, the AND (the minimum of A and B, or min (A,B), or MIN), OR (the maximum of A and B, or max (A,B), or MAX), and NOT (not A, or 1-A, or NOT) logical operators. Other examples of logical operators include other logical operators that perform intersections (or conjunctions), unions (or disjunctions), and complements. These include triangular norm operators and union operators, each of which may have their own logical requirements regarding boundaries, monotonicity, commutativity, and associativity.

In this example, the Xa and Ya position inputs are combined using the MIN logical operation. The output of the combination logical operation is a discrete value. As illustrated in FIG. 5, item (a) has a degree of membership of 0.25, item (b) has a degree of membership of 0.75, item (c) has a degree of membership of 0.75, and item (d) has a degree of membership of 0.25.

As inputs may be members of several different input membership functions, there are a number of different possible permutations for combining 312 the various memberships of the various inputs. For example, FIG. 5 illustrates duplicates of items (a) and (b) in order to illustrate the four different ways the position input's memberships can be permuted for combination 312.

Each possible permutation of input memberships corresponds with a risk membership function. The risk membership functions and their associations with permutations of input membership functions are stored in knowledge base 204. The risk membership functions are associated with the risk values that are used to determine the risk of an object 120. To determine risk values, the permutations of risk membership functions of which the inputs are members are mapped 313 to their corresponding risk membership functions. This mapping 313 can occur in parallel with, or before or after the combination 312, as one does not depend on the other.

FIG. 6 illustrates a set of example risk membership functions, according to one embodiment. The example risk membership functions of FIG. 6 map 313 to the input membership functions illustrated in FIG. 5 of which the position inputs are members. Particularly, item (e) illustrates the risk membership function mapping 313 to the combination of items (a) and (c). That is, item (e) illustrates a risk membership function mapping 313 to the permutation of the X-axis membership function between −3 and 3 with the Y-axis membership function between 10 and above. The risk membership function in item (e) is a triangle function covering risk values between 2 and 6. Similarly, item (f) maps 313 to the permutation of items (b) and (c) and covers risk values between 4 and 8, item (g) maps 313 to the permutation of items (b) and (d) and covers risk values between 6 and 10, and item (h) maps 313 to the permutation of items (a) and (d) and covers risk values between 4 and 8.

More than one permutation of input membership functions may map to the same risk membership function. For example, items (f) and (h) both map to the same risk membership functions. This is expected, particularly, when more inputs are used in the driver assistance system.

To determine the contribution of each of the risk membership functions to the risk value for an object 120, an implication logical operation is performed 314 on each risk membership function using the output of the combination logical operation corresponding that risk membership function. In contrast to the combination logical operation, the output of the implication logical operation is a modified (or adjusted) risk membership function.

Examples of implication logical operations include the MIN function described above, as well as a MAX(a,b) function that takes the maximum of a and b, and probabilistic OR function which follows the form of PROBOR(a,b)=a+b−(a)(b). Other functions may be used as well.

In this example, the MIN implication logical operation is used. Thus, the output of the implication logical operation is the MIN of the result of the previously determined combination and the risk membership function corresponding to that permutation. In FIG. 6, the dashed lines represent the combination outcome that is being compared against the corresponding risk membership function, and the hashed areas represent the outcome of the implication logical operation 314 on the relevant risk membership function.

For example, item (e) is based on a combination of inputs where the MIN of the combination was 0.25 (see FIG. 5). Thus, the dashed line is drawn at 0.25. The relevant risk membership function in this example is the triangle that covers risks between 2 and 6. The outcome of the implication logical operation 314 is an altered risk membership function delineated by the hashed area of item (e). Item (f)-(h) illustrate the outcomes of the implication logical operation on the other possible permutations introduced above.

Although not illustrated in FIGS. 5 and 6, some inputs may be considered more important than others with respect to the each input's respective contribution to the risk value. To account for this contribution, the degrees of membership or the outcomes of the combinations may be weighted before the implication logical operation 314. For example, if the X position input were to be considered more important than the Y position input in the determination of the risk of an object 120a, the outcome of the combination may be modified by multiplying it by a value greater than one, or by adding a positive numerical constant prior to implication 314.

The adjusted risk membership functions are aggregated 315 using an aggregation logical operation. The aggregation logical operation may be performed using any logical operation described above, or more generally any commutative logical operation, including, for example, a SUM function that sums the adjusted risk membership functions, or a MAX function as described above. This example illustrates aggregation using the MAX function. Item (i) illustrates the aggregated risk membership functions from items (e)-(h) above. The result of the aggregation 315 may either be another function or a single numerical value.

The risk value is determined 316 using an output logical operation and the result of aggregation. The output logical operation may be any function including, for example, a centroid function, a bisector function, a middle of maximum function (i.e., the average of the maximum value of the aggregation result), a largest of maximum function, and a smallest of maximum function. In the example of FIG. 6, the centroid function is used to determine a risk value of 6 for object 120a.

Aggregating Object Risk Values by Quadrant

This process described above with respect to FIG. 3B and FIGS. 4-6 may be repeated for other quadrants for the same object, for other objects 120 in the environment 100, and is equally applicable to implementations using many more inputs, including all inputs described above with respect to sensors 206 and 208.

Figure 7:
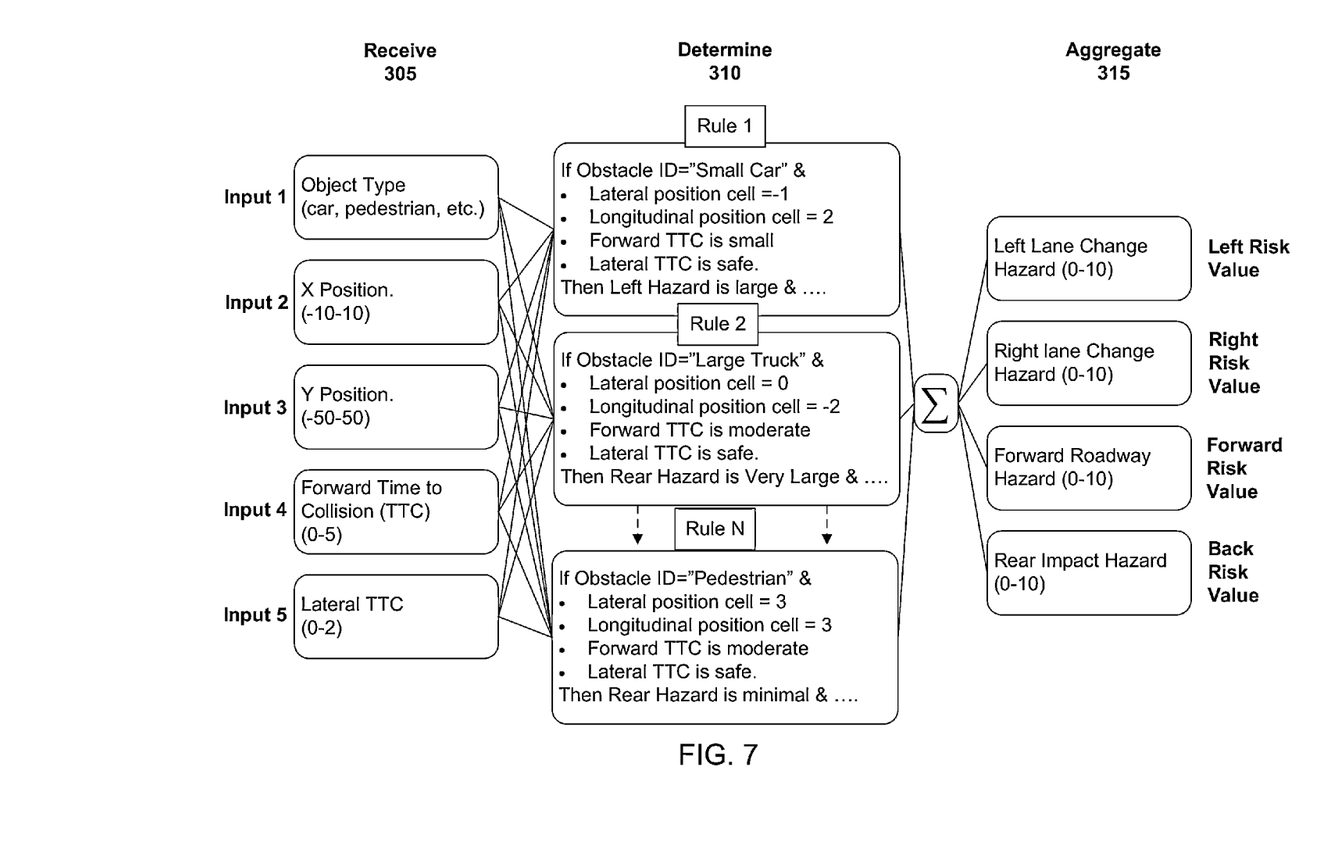
FIG. 7 is a block diagram illustrating the analysis of the risks posed by objects detected in the vehicle environment, according to one embodiment.

FIG. 7 generalizes the process described in FIGS. 3-6. FIG. 7 is a block diagram illustrating the analysis of the risks posed by objects 120 detected in the vehicle environment 100, according to one embodiment. FIG. 7 illustrates a larger set of example inputs than the prior example, including a type of object input, an X position input, a Y position input, a forward time to collision (TTC) input, and a lateral TTC input. The time to collision may be computed based on velocity and acceleration inputs for the vehicle 110 and objects 120 from the sensors 206 and 208.

To determine 310 the risk values for the objects 120 detected in the environment, the inputs are processed using a set of rules as described with respect to FIGS. 3B-6 above. Although processing of inputs using rules is described rigorously above, FIG. 7 illustrates example rules in a more semantic form. Each example rule illustrated in FIG. 7 describes an antecedent (e.g., "if") including a set of matching conditions for the inputs (e.g., permutations of memberships functions the inputs are members of to match that rule). Each rule also includes a consequent (e.g., "then") including a set of risk membership functions matching the permutation specified by the antecedent. The logical operations described above may be specific to particular rules or they may be shared between rules.

Once the risk values for objects 120 have been determined 310, the risk values are aggregated 315 by quadrant to determine the quadrant risks 204. In one embodiment, the rules specify which quadrant each object risk value contributes to. In another embodiment, the quadrant an object risk value contributes to is determined by its physical position (e.g., X axis and Y axis position) in relation to the vehicle 110.

The risk values for all objects 120 in a quadrant can be aggregated using a variety of logical operations. In one embodiment, a quadrant risk value 204 may be determined by summing the risk values of the objects 120 in that quadrant. In another embodiment, the quadrant risk can be obtained by applying the aggregation logical operation (315) (e.g., the MAX function) for the already-implicated (314) risk membership functions for all objects 120 in the quadrant. The quadrant risk value can be computed, for example, by taking the centroid (316) of the resulting aggregated functions for all objects in the environment.

Quadrant risks may also be determined by simply Individual quadrant risk values 204 may be normalized, for example based on the number of objects 120 in that quadrant. Additionally, all four quadrant risk values 204 may be normalized, for example based on the sum of all four quadrant risk values. In this way, object risk values and quadrant risk values are all on the same bounded scale, such that relative differences between risk values indicate different levels of risk to the vehicle 110 and its occupants.

Adjusting Risk Values

Risk values may be adjusted based on inputs received by the vehicle 110 which are not directly tied to individual rules or objects 120, but which nevertheless affect the risks posed to the vehicle 110. Object and quadrant risk values may be adjusted in this manner by local inputs and/or by global inputs.

Local inputs are inputs affect individual object risk values differently. For example, a direction of a driver's attention such as a head direction input or an eye gaze direction input may have been received from an internal sensor 208 indicating that the driver's is looking to the left at that instant in time. Consequently, the ECU 202 may alter the object risk values for objects on the right to be higher than they would be otherwise, due to the driver's lack of attention on that region. Similarly, the ECU 202 may alter the object risk values for objects on the left to be lower than they would be otherwise, in this case due to the driver's known attention to that region.

In another embodiment, local inputs are incorporated into the object risk value determination process described above with respect to FIGS. 3B-6 above.

Alternatively, rather than adjusting object risk values individually, local inputs may be used to adjust the quadrant risk values instead. Using the example above of eye gaze input indicating that the driver's eyes are looking to the left, the ECU may adjust the left quadrant risk value downward versus what it would be otherwise, and may adjust the right quadrant risk upward versus what it would be otherwise.

Object and quadrant risks may also be adjusted based on global inputs that are applied to all objects and/or quadrants equally. Global inputs affect all risk values equally on the basis that they are expected to either negatively affect a driver's ability to react to risks in the vehicle environment 110, and/or negatively affect a driver's ability to mitigate the harm caused by those risks. Examples of global inputs include, for example, weather, road conditions, time of day, driver drowsiness, seat belt warnings, and the weight on each passenger seat. More specifically, poor weather conditions (e.g., rain, fog, snow), hazardous road condition (e.g., wet roads, snow covered roads, debris on the roadway, curvy roadway), nighttime or dusk, indications that the driver is drowsy, and indications that one or more seatbelts are unbuckled while the weight on those seats indicates a person is seated are all examples of global inputs that increase risk values. Conversely, favorable weather conditions (e.g., dry roads), favorable road conditions (e.g., straight roadway, no known hazards), daytime, indications that the driver is not drowsy, and indications that all needed seatbelts are strapped in are all examples of global inputs that reduce risk values.

Driver cognitive load is another example of a global input. Due to multi-tasking, such as cell phone use, entering information in a car's onboard navigation system, adjusting thermostat, changing radio stations, etc., the driver may be paying attention to things other than the road. The ECU 202 may receive inputs regarding the driver's cognitive load. For example, eye gaze input and inputs from vehicle electronics may indicate the total time or frequency with which the driver's attention is diverted from the road. The ECU 202 may be configured to convert this into a driver cognitive load input, which may in turn be used as a global input for determining risk values.

As another example, in addition to using gaze direction (or driver head poze) as a local input, gaze direction may also be used to determine the relative attentiveness of the driver to the forward roadway. Driver attentiveness to the forward roadway is a global input. With respect to driver gaze direction, merely glancing away from the road does not necessarily imply a higher risk of accident. In contrast, brief glances by the driver away from the forward roadway for the purpose of scanning the driving environment are safe and actually decrease near-crash/crash risk. However, long glances (e.g., two 2 seconds) increase near-crash/crash risk. In one embodiment, gaze direction is combined with duration of gaze direction to determine the driver attentiveness input. The driver attentiveness input may be described by a modulation factor that is a function of the time duration that the driver is not attentive to the forward roadway based on the gaze direction (or, alternatively, the head-pose direction).

Additional Considerations

Vehicles implementing embodiments of the present invention include at least one computational unit, e.g., a processor having storage and/or memory capable of storing computer program instructions that when executed by a processor perform various functions described herein, the processor can be part of an electronic control unit (ECU).

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions)

leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions could be embodied in software, firmware or hardware, and when embodied in software, could be downloaded to reside on and be operated from different platforms used by a variety of operating systems. An embodiment can also be in a computer program product which can be executed on a computing system.

An embodiment also relates to an apparatus for performing the operations herein. This apparatus may be specially constructed for the purposes, e.g., a specific computer in a vehicle, or it may comprise a general-purpose computer selectively activated or reconfigured by a computer program stored in the computer, which can also be positioned in a vehicle. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), field programmable gate arrays (FPGAs) or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description above. In addition, an embodiment is not described with reference to any particular programming language. It will be appreciated that a variety of programming languages may be used to implement the teachings as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses without departing from the spirit and scope of the embodiments.

What is claimed is:

1. A method comprising:
   receiving a plurality of vehicle environment inputs, the inputs comprising a position in two dimensions for each of a plurality of objects located around a vehicle, each object located in one of four quadrants surrounding the vehicle;
   determining an object risk value for each of the objects by applying a set of rules to each of the objects, at least a plurality of the object risk values being non-zero, indicating the objects pose a risk to the vehicle;
   aggregating the object risk values in a front quadrant to generate a front quadrant risk value;
   aggregating the object risk values in a back quadrant to generate a back quadrant risk value;
   aggregating the object risk values in a left quadrant to generate a left quadrant risk value;
   aggregating the object risk values in a right quadrant to generate a right quadrant risk value,
   wherein at least one of the front, back, left, and right quadrant risk values is determined by aggregating at least two of the non-zero object risk values; and
   controlling a driver assistance system of the vehicle based on the quadrant risks.

2. The method of claim 1 wherein determining an object risk value for one of the objects comprises:
   determining a plurality of memberships by the vehicle environment inputs in a plurality of input membership functions;
   combining the memberships into a plurality of permutations of the input membership functions;
   mapping the permutations to a plurality of risk membership functions;
   aggregating the risk membership functions;
   determining the object risk value based on the aggregation.

3. The method of claim 1 wherein the object risk values are all on a same bounded scale, wherein similar risk values correlate to similar perceived risks to the vehicle.

4. The method of claim 1 wherein the set of rules comprises a knowledge base predetermined based on behavior of an expert human driver.

5. The method of claim 1 wherein the vehicle environment inputs additionally comprise a driver attentiveness input, and further comprising:
   adjusting each of the quadrant risks value based on the driver attentiveness input.

6. The method of claim 5 wherein adjusting each of the quadrant risk values comprises scaling each of the quadrant risks value upwards or downwards based on the applicability of the driver attentiveness input to the quadrant in which the relevant object is located.

7. The method of claim 5 wherein the driver attentiveness inputs is based on at least one from the group consisting of a driver head pose, a driver eye gaze direction, and a driver's hand position.

8. The method of claim 1 wherein the vehicle environment inputs additionally comprise a plurality of global environment inputs, and further comprising:
adjusting the quadrant risk values based on the global environmental inputs.

9. The method of claim 8 wherein adjusting the quadrant risk values comprises scaling the quadrant risk values upwards or downwards together based on the global environmental inputs.

10. The method of claim 8 wherein the global environment inputs are include at least two from group the group consisting of a local weather condition, a local traffic condition, a time of day, a daylight indicator.

11. The method of claim 1 wherein controlling the driver assistance system comprises activating a lane change warning responsive at least one of the left and right quadrant risks exceeding a threshold.

12. The method of claim 1 wherein controlling the driver assistance system comprises activating a blind spot warning responsive to at least one of the left and right quadrant risks exceeding a threshold.

13. The method of claim 1 wherein controlling the driver assistance system comprises activating a collision warning responsive to at least one of the front and back quadrant risks exceeding a threshold.

14. The method of claim 1 wherein controlling the driver assistance system comprises automatically braking the vehicle responsive to the front quadrant risk exceeding a threshold.

15. A system comprising:
a knowledge base comprising a non-transitory computer readable storage medium, the knowledge base storing a set of rules;
an electronic control unit (ECU) comprising a processor and configured to:
receive a plurality of vehicle environment inputs, the inputs comprising a position in two dimensions for each of a plurality of objects located around a vehicle, each object located in one of four quadrants surrounding the vehicle;
determine an object risk value for each of the objects by applying the set of rules to each of the objects, at least a plurality of the object risk values being non-zero, indicating the objects pose a risk to the vehicle;
aggregate the object risk values in a front quadrant to generate a front quadrant risk value;
aggregate the object risk values in a back quadrant to generate a back quadrant risk value;
aggregate the object risk values in a left quadrant to generate a left quadrant risk value;
aggregate the object risk values in a right quadrant to generate a right quadrant risk value
wherein at least one of the front, back, left, and right quadrant risk values is determined by aggregating at least two of the non-zero object risk values; and
control a driver assistance system of the vehicle based on the quadrant risks.

16. The system of claim 15 wherein determining an object risk value for one of the objects comprises:
determining a plurality of memberships by the vehicle environment inputs in a plurality of input membership functions;
combining the memberships into a plurality of permutations of the input membership functions;
mapping the permutations to a plurality of risk membership functions;
aggregating the risk membership functions;
determining the object risk value based on the aggregation.

17. The system of claim 15 wherein the object risk values are all on a same bounded scale, wherein similar risk values correlate to similar perceived risks to the vehicle.

18. The system of claim 15 wherein the vehicle environment inputs additionally comprise a driver attentiveness input, and further comprising:
adjusting each of the quadrant risk values based on the driver attentiveness input.

19. The system of claim 15 wherein the vehicle environment inputs additionally comprise a plurality of global environment inputs, and further comprising:
adjusting the quadrant risk values based on the global environmental inputs.

* * * * *